United States Patent Office
3,266,900
Patented August 16, 1966

3,266,900
COATED ALUMINUM LITHOPLATE AND METHOD

Walter G. Zelley, New Kensington, Pa., assignor to Aluminum Company of America, Pittsburgh, Pa., a corporation of Pennsylvania
No Drawing. Filed June 10, 1963, Ser. No. 286,464
4 Claims. (Cl. 96—75)

This invention relates to conversion coated aluminum sheet used as a lithoplate, and to the preparation of the same. It particularly concerns aluminum lithoplates provided with an applied light-sensitive diazo resin coating. As used herein, the word "aluminum" includes pure aluminum, commercial aluminum containing usual impurities, and aluminum base alloys.

One important application of aluminum in sheet-like form is in the preparation of lithographic printing plates. The surface preparation usually used for the aluminum surface of such a plate optionally includes mechanical or chemical graining or etching, and preferably a pre-treatment for reception of the applied light-sensitive coating. specially when diazo resin light-sensitive coatings are to be used, a suitable pre-treatment is believed necessary for the purposes of improving the bonding of the diazo resin coating to the aluminum and inhibiting deleterious reaction between the diazo resin and the underlying aluminum. A pre-treatment of this type should provide a film or coating on the aluminum surface, as diazo resins are sensitive to metals (see United States Patent No. 2,714,066 and British Patent No. 699,413).

In addition to the bonding function described above, a desired surface pre-treatment is one which enhances the water-wettability of non-image areas and enhances the wearing properties of the lithoplate in use. A very thin film, on the other hand, can have only a limited effect upon wearing properties of the plate as contrasted with conversion coating. Anodic oxide coatings have been previously suggested for these purposes, but have met with only limited acceptance.

General objects of the invention include provision of a conversion coated aluminum sheet for lithoplate use, one which is suitable for the bonding of diazo resin, inhibits deleterious reaction between diazo resin and aluminum, provides a wettable surface, and offers improved wearing qualities.

According to the invention an aluminum sheet is provided with an adsorbent alpha-alumina monohydrate conversion coating, a form of aluminum oxide sometimes referred to as boehmite. Then that coating is treated with alkali metal dichromate solution so that the dichromate is adsorbed by the coating. The sheet so treated may then advantageously have a light-sensitive diazo resin coating applied thereover. The conversion coating is characterized by water-wettability, and receptivity for and adhesion to the light-sensitive diazo resin coating. The composite plate does not exhibit deleterious reaction between the resin and the conversion coating or the underlying aluminum.

Illustrative of the production of the novel, coated aluminum sheet and diazo resin coated lithoplate, and the methods of preparing the same, are the following.

Aluminum sheet of 1100 grade and of 3003 and 5052 alloys, for example, may be used, preferably cleaned and chemically etched or mechanically grained if desired (but etching and graining are not necessary). A convenient cleaner and mild etchant that may be used is a 5 percent solution of sodium hydroxide. It is commonly used at 150° F. for one-half minute, and may be followed by a smut removing dip for one-half minute in nitric acid (50 percent by volume of concentrated nitric acid and water) at room temperature.

The aluminum sheet selected for treatment in accordance with the invention is treated with a hot aqueous medium selected from the group consisting of water and water made alkaline to a pH up to about 10.5. For example, the sheet may be immersed for ¼ to 20 minutes, preferably about 10 minutes, in a solution consisting essentially of

| Component | Ml./l. |
|---|---|
| Triethanolamine | 1 |
| Water | Balance |

(pH about 9–9.5)

or the sheet may be immersed for about 1 to 90 minutes in distilled or tap water. In either case the aqueous medium is maintained at a temperature between about 175° F. and the boiling point, preferably 200° F. Water made mildly alkaline with alkaline earth compounds, or with other alkaline materials, preferably to a pH between about 8.5 to 10.5, may advantageously be used to provide the alpha-alumina monohydrate conversion coating, as is well known in the aluminum industry (see, for example, U.S. Patent 3,039,899). The time of treatment is not critical, being determined so as to be sufficient to produce the adsorbent conversion coating, the alkaline water treatments taking less time than distilled or tap water. Treating the aluminum as indicated produces a conversion coating on the exposed aluminum surface, a coating which desirably weighs about 0.1 to 1.0 mg. per square inch of surface or more.

Thereafter, preferably following an intermediate water rinse, the coated surface is immersed in or otherwise treated with, preferably for 5 seconds or more, conveniently for about 5 minutes in view of the recommended 10 minute coating time, a solution consisting essentially of

| Component | G./l. | |
|---|---|---|
| | Preferred | Range |
| Sodium dichromate adjusted to pH 2–8 with $CrO_3$ or NaOH | 50 | 1–100 or more. |
| Water | balance | |

maintained at a solution temperature between room temperature and the boiling point, conveniently 180° F. Any other alkali metal dichromate may be substituted for sodium dichromate, and the nominal pH will be about 4–6. It is preferred to maintain the pH between 2 and 8 as by additions of chromic acid or caustic as needed. This treatment effects adsorption of dichromate by the coating.

After drying the coated and dichromate treated sheet, a light-sensitive diazo resin coating may be applied. One suitable diazo resin coating that may be used is the "wipe on" diazo resin product sold as "Velvacote" by Western Litho Plate and Supply Company. The plate is coated with this diazo resin by sponge application and drying.

Without the conversion coating step of the chemical pre-treatment herein described, the image area of an exposed plate will be partially or completely lost in the development stage. Even with the conversion coating present, the diazo resin coating usually deteriorates unless there is little delay between application of the diazo resin and exposure of the plate. That is, the plate has poor storage life. However, when dichromate is adsorbed by the conversion coating, as described herein, it is found that the diazo resin coating is stable for a greatly extended time, and withstands such accelerated tests as heating for 15 minutes at 140° F. or heating for 15 minutes at 90% humidity and 100° F. without deterioration. Further, plates prepared in accordance with the invention will withstand conventional ink scumming tests with satisfactory clearing of the plates when water is re-applied, and the plates exhibit good wearing qualities.

Use of the dichromate impregnated conversion coatings on aluminum as herein described has permitted unexpected improvement in storage life and utility of aluminum lithoplates provided with a diazo resin type of light-sensitive coating.

What is claimed is:

1. A conversion coated aluminum sheet, for use as a lithoplate with an applied light-sensitive diazo resin coating, comprising
   an aluminum sheet,
   a surface of said sheet being provided with an adsorbent alpha-alumina monohydrate conversion coating, and
   alkali metal dichromate adsorbed by said conversion coating said adsorbed dichromate being obtained by treating said conversion coating with a solution consisting essentially of at least about 1 gram per liter of alkali metal dichromate and water maintained at a pH between about 3 and 7, at a solution temperature between room temperature and the boiling point,
   said conversion coated sheet, with adsorbed dichromate, being characterized by water-wettability, and by receptivity for and adhesion to a light-sensitive diazo resin coating, applied for lithoplate use, without exhibiting deleterious reaction between such resin coating and either the conversion coating or the underlying aluminum.

2. An aluminum lithoplate with a light-sensitive diazo resin coating comprising
   an aluminum sheet,
   a surface of said sheet being provided with an adsorbent alpha-alumina monohydrate conversion coating,
   alkali metal dichromate adsorbed by said conversion coating said adsorbed dichromate being obtained by treating said conversion coating with a solution consisting essentially of at least about 1 gram per liter of alkali metal dichromate and water maintained at a pH between about 3 and 7, at a solution temperature between room temperature and the boiling point, and
   a light-sensitive diazo resin coating adhering to said conversion coating,
   said lithoplate being characterized by water-wettability of non-image areas of said conversion coating following exposure and development, and by adhesion between said diazo resin coating and said conversion coating without exhibiting deleterious reaction between such resin coating and either the conversion coating or the underlying aluminum.

3. A method of preparing a conversion coated aluminum sheet, for use as a lithoplate with an applied light-sensitive diazo resin coating, comprising
   providing a surface of an aluminum sheet with an adsorbent alpha-alumina monohydrate conversion coating, and
   thereafter treating said conversion coating with a solution consisting essentially of at least about 1 gram per liter of alkali metal dichromate and water maintained at a pH between about 3 and 7,
   at a solution temperature between room temperature and the boiling point,
   thereby effecting adsorption of alkali metal dichromate by said conversion coating.

4. A method of preparing an aluminum lithoplate with a light-sensitive diazo resin coating, comprising
   providing a surface of an aluminum sheet with an adsorbent alpha-alumina monohydrate conversion coating, and
   thereafter treating said conversion coating with a solution consisting essentially of at least about 1 gram per liter of alkali metal dichromate and water maintained at a pH between about 3 and 7,
   at a solution temperature between room temperature and the boiling point,
   thereby effecting adsorption of alkali metal dichromate by said conversion coating, and
   applying a light-sensitive diazo resin coating over said conversion coating.

References Cited by the Examiner

UNITED STATES PATENTS

| | | | |
|---|---|---|---|
| 2,859,148 | 11/1958 | Altenpohl | 148—6.27 |
| 3,160,506 | 12/1964 | O'Connor et al. | 96—33 |

OTHER REFERENCES

Derwent, Belgian Patents Report, vol. 76B, June 30, 1961, pages A15–A16, abstract of Belgian Patent 598,570.

Chemistry of Lithography, Lithographic Technical Foundation, New York, 1952, pages 92–115 and 155.

Wernick, "Metal Finishing," vol. 54, August 1956, pages 53–58.

NORMAN G. TORCHIN, *Primary Examiner.*

R. L. STONE, A. D. RICCI, *Assistant Examiners.*